Jan. 30, 1951     G. L. MEYERS ET AL     2,539,853
METHOD AND MACHINE FOR MAKING FLEXIBLE TUBING
Filed Dec. 8, 1947     3 Sheets-Sheet 1

INVENTORS
GEORGE L. MEYERS,
JOHN E. SCHRINER and
BY JOHN C. SHUTT

Oberlin + Limbach
ATTORNEYS.

Jan. 30, 1951　　　G. L. MEYERS ET AL　　　2,539,853
METHOD AND MACHINE FOR MAKING FLEXIBLE TUBING
Filed Dec. 8, 1947　　　3 Sheets-Sheet 2

INVENTORS
GEORGE L. MEYERS,
JOHN E. SCHRINER and
BY JOHN C. SHUTT.

Oberlin & Limbach
ATTORNEYS

Jan. 30, 1951 G. L. MEYERS ET AL 2,539,853
METHOD AND MACHINE FOR MAKING FLEXIBLE TUBING
Filed Dec. 8, 1947 3 Sheets-Sheet 3
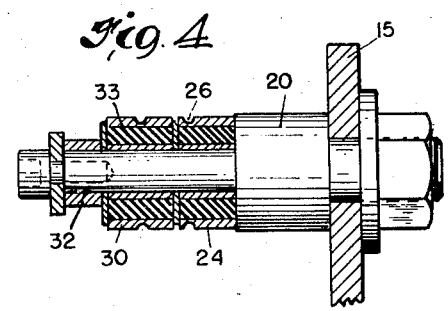
Fig. 4
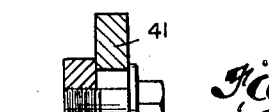
Fig. 5
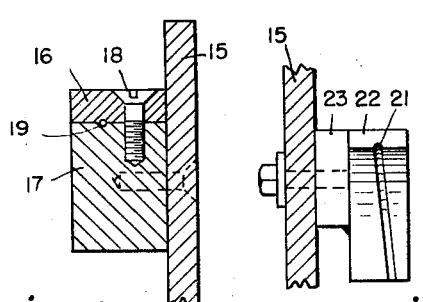
Fig. 6
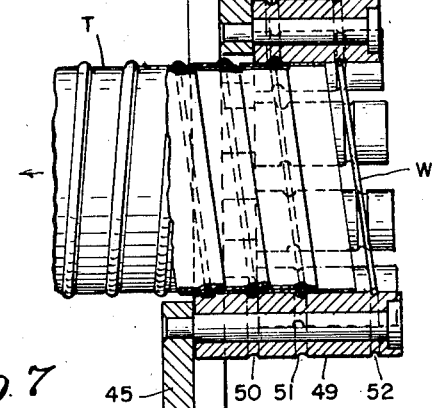
Fig. 7
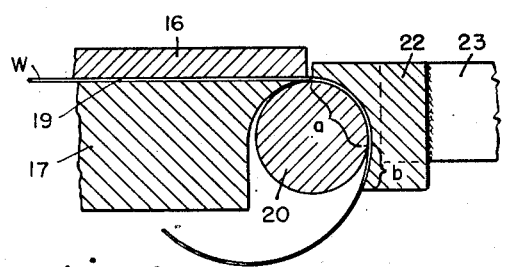
Fig. 8
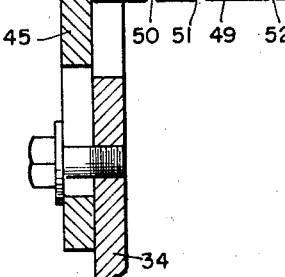
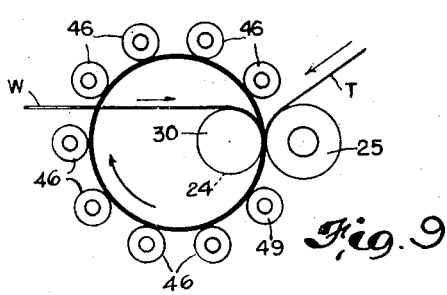
Fig. 9
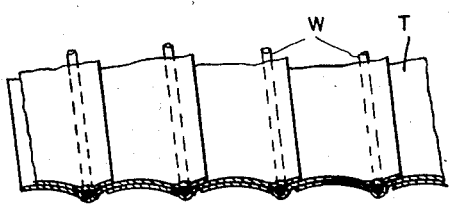
Fig. 10
INVENTORS
GEORGE L. MEYERS,
JOHN E. SCHRINER and
BY JOHN C. SHUTT.
Oberlin & Limbach
ATTORNEYS.

Patented Jan. 30, 1951

2,539,853

UNITED STATES PATENT OFFICE 2,539,853

METHOD AND MACHINE FOR MAKING FLEXIBLE TUBING

George L. Meyers and John E. Schriner, Willoughby, and John C. Shutt, Wickliffe, Ohio, assignors, by mesne assignments, to The Ohio Rubber Company, Willoughby, Ohio, a corporation of Delaware Application December 8, 1947, Serial No. 790,384

28 Claims. (Cl. 154—6)

This invention relates as indicated to a method and machine for making flexible tubing and more particularly of spiral-wire reinforced hose of the corrugated type now commonly employed as defroster hose in automobiles, as vacuum cleaner hose, and for ventilating purposes and the like.

In the past, tubing or hose of the type here under consideration has generally been manufactured in relatively short lengths as follows: A wire is first wrapped around a mandrel to form a helix. A length of cloth treated with a rubber compound is then folded about such mandrel and wire, with its opposed edges slightly overlapping lengthwise of the mandrel. String is wrapped spirally around the cloth-covered mandrel between the spirals of the wire, thereby imparting a corrugated effect. The entire mandrel is next transported to a curing oven where it remains for about thirty minutes. After completion of the curing of the rubber composition, the mandrel is removed from the oven and the finished length of tubing is stripped from the mandrel. It is obvious that the above-described process is tedious and expensive out of all proportion to the cost of the materials employed. Furthermore, very large quantities of flexible tubing of this type are employed in industry so that the need for a method and machine for the continuous production of tubing of this type has been severe.

It is therefore a primary object of our invention to provide a method and apparatus for the continuous production of flexible tubing.

Another object is to provide a method and apparatus for production of flexible, wire reinforced, corrugated tubing in which such wire is entirely enclosed within the material forming the flexible wall of such tubing.

Still another object is to provide such method and apparatus whereby the diameter of the tubing produced may readily be varied as desired.

Another object is to provide tubing of uniform structure and without the longitudinal rib or welt which is obtained in current practice by overlapping the edges of the fabric covering.

Other objects and advantages will become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the said annexed drawings:

Fig. 3 is a vertical sectional view taken along the line 3—3 on Fig. 2;

Fig. 4 is a vertical detail view of one component of the wire forming means and of the adjacent resiliently mounted rollers, the latter being sectioned to show the means of mounting the same;

Fig. 5 is a sectional view taken along the line 5—5 on Fig. 1 showing the tubing in course of manufacture;

Fig. 6 is a vertical sectional view along the line 6—6 on Fig. 3;

Fig. 7 is an elevational view of the shoe or die adapted to cooperate with the other component of the wire forming means shown in Fig. 4;

Fig. 8 is an elevational view illustrating the operation of such wire forming means;

Fig. 9 is a semi-diagrammatic view illustrating the operation of the machine;

Fig. 10 is a fragmentary sectional view showing the formation of the tubing as it comes from the machine; and Fig. 11 is a view of such tubing as it appears after the curing operation.

In accordance with our invention, a continuous length of flexible tubing may be produced by forming a continuous length of wire into a helix on which a continuous length of tape is wound in overlapping relationship. While various types of wire or the equivalents thereof may be employed, a typical example for use in defroster hose or the like would be .040 gauge semi-hard, copper-clad iron wire, and ordinary friction tape comprising uncured rubber and sheeting is suitable as the other component. The tape may, of course, be of various fabrics impregnated with a variety of compositions such as "Hycar" (a synthetic rubber comprising modified copolymers of butadiene and acrylonitrile), "neoprene" (a chlorobutadiene polymer), reclaimed rubber, certain of the silicones, and plastics such as "Geon" (vinyl chloride resins), and "Velon" (vinylidene chloride). In the case of certain of the synthetic plastics and the better grades of rubber, the same may be employed alone without any fabric for many uses.

The reinforcing element, generally termed a "wire" here and in the claims, need not necessarily be of circular cross-section, or even of metal. As used in the claims, such term is intended to include all equivalent elongated elements whether formed of metal or non-metallic materials such as hard rubber or synthetic plastics, such as cellulose acetate. Also, as above indicated, the strip of wall material which is adapted to be wound on the reinforcing helix may comprise a tape containing a "plastic compound" adapted to adhere successive turns of the tape together and form a strong wall for the tubing, when cured. The term "plastic compound" as thus employed here and in the claims is intended to include the usual rubber compound and the like within its scope as well as suitable synthetic plastics, for example.

Figure 1:
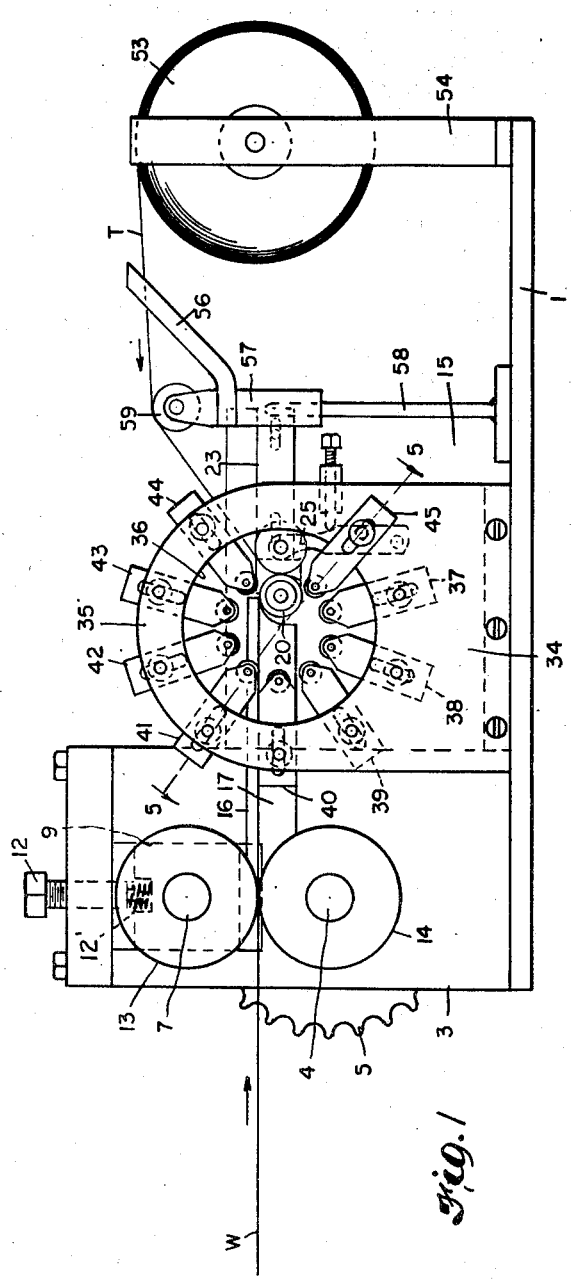
Fig. 1 is a front elevational view of one form of apparatus embodying our invention.

Referring now more particularly to the drawings, the embodiment of our apparatus there illustrated comprises a base or bed 1 supporting stands or uprights 2 and 3 in which a drive shaft 4 is journalled. Such shaft itself is adapted to be driven through sprocket 5 and chain 6 from any suitable power source. An upper shaft 7 journalled in vertically adjustable blocks 8 and 9 in such stands is adapted to be driven by drive shaft 4 through gearing 10. Blocks 8 and 9 are under resilient pressure by adjustable screws 11 and 12, such screws bearing on springs 12 in recesses in the upper surfaces of such blocks. A pair of grooved drive wheels 13 and 14 are keyed to the ends of shafts 7 and 4 respectively adjacent stand 3, upper wheel 13 being adjusted relative to wheel 14 to cause wire W which is drawn from a large supply spool (not shown) to be tightly clamped therebetween and to be positively fed from left to right as viewed in Fig. 1.

Adjacent stand 3 and in substantial alignment therewith is a further stand or bracket 15 on which said elements of the tube forming means are mounted. A guide block through which the wire passes after leaving drive wheels 13 and 14 is mounted in close proximity thereto, and for convenience is formed of an upper and lower block 16 and 17 respectively (see Fig. 6) secured together by means such as screws 18 and having complementary grooves in their opposed faces providing a straight passage 19 for the wire from such drive wheels to the wire forming device. This guide means serves to prevent buckling of the wire as it is pushed into the forming means. Wire W emerges from passage 19 tangentially of the upper surface of a rounded boss 20 (see Figs. 3, 4, and 8) where it enters the upper end of a groove 21 in the under face of die or shoe 22 likewise mounted on bracket 15 (see Fig. 7). Such shoe is carried by a bar 23 which is secured to bracket 15 for adjustment toward and away from boss 20 to properly accommodate the wire. Groove 21 in the concave inner face of shoe 22 is pitched outwardly from bracket 15 so that as wire W passes therealong the latter is not only circularized but also caused to assume a helical conformation. When forming tubing of a small diameter, it is important that the curvature of boss 20 and cooperating shoe 22 comprise an arc $a$ of lesser radius than that desired in the finished tubing and that the face of shoe 22 then continue as an arc $b$ of the radius of the desired tubing (see Fig. 8). The wire is thus somewhat overbent in the first operation and then permitted to spring outwardly before leaving the supporting shoe, thereby avoiding any tendency to buckle. When forming large diameter tubing, this problem is not nearly so acute and no change in the curvature of shoe 22 will ordinarily be required.

The wire then continues to make a complete loop, being exteriorly supported by grooved rollers 46 and roller 49, as described below. The lowermost of the rollers 46 (see diagrammatic Fig. 9) are omitted from Fig. 2 to avoid confusing such latter figure. At the completion of such loop, the wire passes between roller 24, which is mounted axially of boss 20, and roller 25. Each of these rollers has a complementary groove 26 and 27 in its face in which the wire is held and by which its lateral position is determined. Roller 25 is carried on the end of a lever arm 28 pivotally mounted at 29 on supporting bracket 15. The pressure of such roller against rollers 24 and 30 may be regulated by means of adjusting screw 31. Both rollers 24 and 30 are mounted on a stud 32 extending axially of boss 20 (see Fig. 4) and include an inner rubber layer 33 whereby such rollers resiliently resist the pressure of roller 25.

Figure 2:
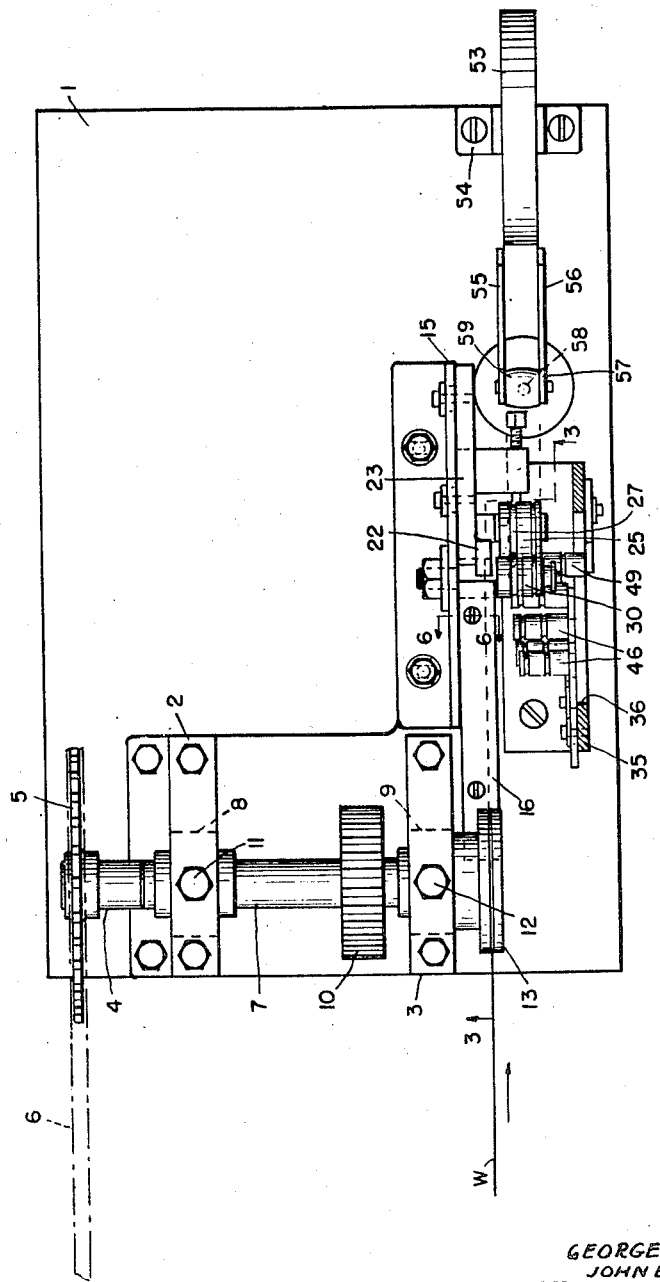
Fig. 2 is a top plan view of such apparatus showing the top portion of the guide support broken away to disclose the tube forming means.

Another bracket or supporting stand 34 is mounted on bed 1 in front of bracket 15, the upper portion 35 of such stand 34 having a large circular opening 36 therein. A plurality of slidably radially adjustable roller-supporting members 37, 38, 39, 40, 41, 42, 43, and 44 are positioned about such circular opening and adapted to be secured in desired radial adjustment. An additional similarly adjustable member 45 is mounted on the outside of stand 34 (see Figs. 1 and 5) whereas each of the other members is mounted on the inner side of such stand. Rollers such as 46 are carried by the inner ends of each of such members 37 to 44, each roller having two peripheral grooves 47 and 48 thereabout. Roller 49 carried by the inner end of outer member 45, however, is longer than the other rollers and is provided with three peripheral grooves 50, 51, and 52. As best shown in Figs. 2 and 5, such grooves in successive rollers are progressively offset so as to determine the pitch of the wire helix which engages such grooves on the radially inward sides of such rollers with relation to opening 36. The members carrying these rollers are adjusted to conform to the diameter of the helix produced by the action of boss 20 and shoe 22 as above described. It is thus possible to produce a wide variety of tube diameters on the same machine by merely changing shoe 22 and adjusting the position of the rollers. Boss 20 need not be changed unless the change in diameter is very considerable.

The spacing of grooves 51 and 52 is greater than the spacing of grooves 51 and 50, and there is a similar disposition of the grooves in rollers 46 whereby the pitch of the wire helix is lessened as such helix moves from right to left as viewed in Fig. 5. In other words, the first turn or loop of the wire helix is shifted toward the preceding turns and thereafter maintains a uniform pitch. The reason for such shifting will be made clear below.

The tape T which is to form the other component of the flexible tubing is drawn from a supply spool 53 rotatably supported by stand 54. Such tape next passes between the guide arms 55, 56 carried by a swivel head 57 mounted for rotation about a vertical axis on an upright rod 58. The tape then passes over pulley 59 and is conducted between roller 25 and resilient rollers 24 and 30. The tape passes underneath, i. e. outside, wire W and is adhered thereto. As the helix moves from right to left as viewed in Fig. 5, the first turn of wire engaged by the rollers is shifted to the left relative to the preceding turns as explained above and since such first turn lies in grooves in the rollers it will be shifted exteriorly of the first turn of tape applied to the next preceding turn of wire. Thus when the tape is now applied to such turn of wire which has been shifted axially of the helix, the wire will be incorporated between overlapping layers of tape. The resultant structure of tubing is best illustrated in the fragmentary Fig. 10 which shows the tubing of Fig. 5 prior to the curing operation. During the curing operation a certain shrinkage takes place which may considerably accentuate the corrugation, forming alternate ridges 60 and valleys 61, the ridges of course indicating the wire now firmly embedded and sealed therein. The degree to which the turn of the helix is laterally shifted determines the extent by which the wire is covered by the overlapping of the tape. If desired, of course, the tubing may be formed without causing any shifting to take place, by using appropriate grooved rollers, and a flexible tubing formed in which the inner wire helix is exposed rather than enclosed between the overlapping portions of the tape. Ordinarily it will be much preferred that the wire helix be enclosed between the overlapping tape since this not only protects the wire but prevents any shifting of the same in use, as when the tube is sharply bent, for example. The curing operation employed will conform to that conventionally used for the particular plastic compound and the term is intended to include the usual heat treatments by which such plastics are "set," such as vulcanization of rubber.

Steam curing of the usual rubber compound causes considerable shrinkage and corresponding corrugation of the tubing. Where such corrugating effect is not desired, as in vacuum cleaner hose, air curing may be employed instead, which minimizes this tendency. It should be noted that since the hose may be made with the reinforcing helix entirely enclosed between layers of tape such helix is thereby held against shifting even when there is no appreciable corrugation to hold it in place. The degree of corrugation may also be regulated by controlling the back tension on the tape at the station where it is applied. The greater such tension, the more pronounced the corrugating effect.

Other variations include application of the plastic compound or adhesive to the tape at the tape-applying station, such procedure sometimes being necessary where the compound or adhesive dries or hardens too quickly to permit its previous application to the tape. Instead of providing the degree of overlap of the tape shown in Fig. 10, for example, such overlap may be just sufficient to enclose the helical reinforcing member leaving only a single thickness between the turns of such member. Tubing of this type is very light and flexible and much preferred for some purposes. Fibre-glass tape is particularly suitable under some operating conditions.

The method and apparatus of our invention are thus capable of producing a new and improved flexible tubing of indefinite length. Because such apparatus is adapted to continuous operation, costs are substantially reduced and a minimum of supervision is required. While the tubing will ordinarily be cut into fairly short lengths prior to curing, it may be passed through the curing oven as a continuous length and cut into sections subsequently. The use of infra-red lamps for such continuous curing operation has been found to be particularly effective and convenient.

Other modes of applying the principle of the invention may be employed, change being made as regards the details described, provided the features stated in any of the following claims or the equivalent of such be employed.

We therefore particularly point out and distinctly claim as our invention:

1. In the production of flexible tubing, the steps which comprise continuously forming a wire into a helix while continuously rotating the helix thus produced to advance the same axially from the forming station, adhering a continuous length of tape containing a plastic compound to such helix at a turn spaced from such forming station, continuously shifting the next following turn axially toward the turn to which the tape has been thus just applied, to progressively overlie such tape as it approaches the tape applying station where it is itself overlaid and thus enclosed between overlapping layers of tape, pressing such overlapping portions of the tape together to cause them to adhere tightly with such wire therebetween, and curing such plastic compound.

2. In the production of flexible tubing, the steps which comprise continuously forming a wire into a helix while continuously rotating the helix thus produced to advance the same axially from the forming station, adhering a continuous length of tape to such helix at a turn spaced from such forming station, and continuously shifting the next following turn axially toward the turn to which the tape has been thus applied, to progressively overlie such tape as it approaches the tape applying station where it is itself overlaid and thus enclosed between overlapping layers of tape.

3. In the production of flexible tubing, the steps which comprise continuously forming an elongated element into a helix while continuously rotating the helix thus produced to advance the same axially from the forming station, adhering a continuous length of tape to such helix at a turn spaced from such forming station, and continuously shifting the next following turn axially toward the turn to which such tape has been thus applied, to progressively overlie such tape as it approaches the tape applying station where it is itself overlaid and thus enclosed between overlapping layers of tape.

4. In the production of flexible tubing, the steps which comprise continuously forming a wire into a helix while continuously rotating the helix thus formed to advance the same axially from the forming station, and adhering a continuous strip of wall material containing a plastic compound to such rotating and advancing wire helix with an edge of each turn of such material overlapping the edge of a next adjacent turn.

5. In the production of flexible tubing, the steps which comprise continuously forming a wire into a helix while continuously rotating the helix thus formed to advance the same axially from the forming station, and adhering a continuous length of tape to such rotating and advancing wire helix with the edge of one turn of tape overlapping the edge of the next preceding turn of tape and with such wire enclosed between such overlapping portions.

6. In the production of flexible tubing, the steps which comprise continuously forming an elongated reinforcing member into a helix while continuously rotating the helix thus formed to advance the same axially from the forming station, and then applying a continuous strip of wall material to such rotating and advancing helix with an edge of each turn of such material overlapping the edge of a next adjacent turn.

7. In the production of flexible tubing, the steps which comprise continuously forming an elongated reinforcing member into a helix while continuously rotating the helix thus formed to advance the same axially from the forming station, then winding a continuous strip of wall material directly on such rotating and advancing helix, and adhering together adjacent turns of such wall material.

8. In the production of flexible tubing, the steps which comprise continuously forming a wire into a helix about a mandrel, such helix being of greater diameter than such mandrel, continuously rotating the helix thus formed to advance the same axially from the forming station, adhering a continuous length of tape containing a plastic compound to such rotating and advancing wire helix with an edge of each turn of tape overlapping the edge of a next adjacent turn, and curing such plastic compound.

9. In the production of flexible tubing, the steps which comprise continuously forming an elongated reinforcing member into a helix about a mandrel, such helix being of greater diameter than such mandrel, continuously rotating the helix thus formed to advance the same axially from the forming station, applying a continuous strip of wall material directly to such rotating and advancing helix, and adhering together adjacent turns of such wall material.

10. In the production of flexible tubing, the steps which comprise continuously pushing a wire through forming means, thereby forming such wire into a helix, continuously rotating such helix and moving the same axially by continued pushing of such wire through such forming means, winding a continuous strip of plastic containing tape on such helix by means of such rotation thereof, adhering turns of such tape together to form a wall for such tubing, and curing such plastic.

11. In the production of flexible tubing, the steps which comprise continuously pushing a wire through forming means, thereby forming such wire into a helix, continuously rotating such helix and moving the same axially by continued pushing of such wire through such forming means, winding a continuous strip of wall material on such helix by such rotation thereof, and adhering turns of such material together to form a wall for such tubing.

12. In the production of flexible tubing, the steps which comprise continuously pushing an elongated reinforcing member through forming means, thereby forming such member into a helix, continuously rotating such helix and moving the same axially by continued pushing of such member through such forming means, and winding a continuous strip of wall material on such rotating and advancing helix.

13. In the production of flexible tubing, the steps which comprise continuously forming an elongated reinforcing member into a helix at a fixed forming station whereby such helix is caused to rotate and advance axially from such station, and then initially securing wall material to said elongated member by winding a continuous strip of wall material on such rotating and advancing helix.

14. In the production of flexible tubing, the steps which comprise continuously forming a wire reinforcing member into an open helix at a fixed forming station whereby such helix is caused to rotate and advance axially from such station, and then initially securing wall material to said wire by winding a continuous strip of wall material on such rotating and advancing helix.

15. In the production of flexible tubing, the steps which comprise continuously forming a wire reinforcing member into an open helix at a fixed forming station whereby such helix is caused to rotate and advance axially from such station, supporting and containing such helix at a plurality of circumferential points exteriorly thereof, winding a continuous strip of wall material on such helix, and adhering turns of such material together to form a wall for such tubing.

16. In the production of flexible tubing, the steps which comprise continuously forming an elongated reinforcing member into an open helix, supporting and containing such helix exteriorly thereof, and winding a continuous strip of wall material on such helix.

17. In apparatus for the continuous production of flexible tubing, a pair of pinch rolls adapted to grip a continuous length of wire passing therebetween, drive means operative to drive said rolls to positively advance such wire, guide means adapted to direct such advancing wire, die members having curved cooperating faces adapted to receive such advancing wire therebetween from said guide means to circularize the same, at least one of said faces having a groove therein wherein such wire lies, said groove being disposed to direct such circularized wire in a helical path, a plurality of grooved rollers circularly arranged for passage of such helix axially within such circle with such grooves of said rollers engaging turns of such helix to guide and support the same, a roller within such circle adapted to engage the inside of a turn of such helix, an opposing roller adapted to engage the outside of such helix at the same point, and means adapted to supply a continuous length of tape between said opposed rollers to be wound upon said rotating helix, certain of said grooves in said circularly arranged rollers being relatively spaced to shift the turn of said helix next following the turn passing between said opposed rollers axially toward the turn to which such tape has just been applied, whereby such following turn will be laterally shifted to overlie the edge of such tape prior to the application of such tape to such following turn itself.

18. In apparatus for the continuous production of flexible tubing, forming means adapted to circularize a wire fed thereto, said forming means being arranged to direct such circularized wire in a helical path, pinch rolls operative to feed such wire into said forming means, a plurality of rollers having grooves in their surfaces adapted to receive turns of such helically disposed wire, opposed rollers between which such helically disposed wire passes, and means adapted to supply a continuous length of tape between said opposed rollers for application to such helix, said grooves in said rollers being relatively spaced to shift the turn of said helix next following the turn passing between said opposed rollers axially toward the turn to which such tape has just been applied, whereby such following turn will be axially shifted to overlie the edge of such tape prior to the application of such tape to such following turn itself.

19. In apparatus for the continuous production of flexible tubing, forming means adapted to form a wire fed thereto into a helix, means operative to feed such wire to said forming means, a plurality of rollers adapted to support and contain such helix exteriorly thereof as it continuously rotates and advances axially, a tape-applying station comprising opposed rollers between which such helically disposed wire is adapted to pass, said last-named rollers being adapted to press a continuous length of tape fed therebetween against such wire, and means adapted continuously to shift axially the next turn of such helix approaching such tape-applying station to overlie the edge of such tape, whereupon such wire will be enclosed between the turns of such tape when it reaches such tape-applying station.

20. In apparatus for the continuous production of flexible tubing, forming means adapted to form a wire into a helix, means operative to pass such wire through such forming means, means adapted to support and contain such helix exteriorly thereof as it continuously rotates and advances axially, a strip-applying station comprising means adapted to apply a continuous strip of wall material to such rotating and advancing helix, and means adapted to shift axially the next turn of such helix approaching such strip-applying station to overlie the edge of such strip, whereupon such wire will be enclosed between the turns of such strip when it reaches such strip-applying station.

21. In apparatus for the continuous production of flexible tubing, forming means adapted to form a wire into a helix, means operative to pass such wire through such forming means, means adapted to wind a continuous strip of wall material on the continuously rotating wire helix advancing axially from said forming means, and means adapted to shift a next following turn of such wire helix to overlie such strip.

22. In apparatus for the continuous production of flexible tubing, forming means operative to form a wire into a helix, means operative to wind a continuous strip of wall material on such wire helix, and means adapted to shift a following turn of such helix to overlie such strip.

23. In apparatus for the continuous production of flexible tubing, forming means adapted to form a wire fed thereto into a helix, pinch rolls operative to feed a wire to said forming means, a plurality of rollers adapted to support and contain such helix circumferentially exteriorly thereof as it continuously rotates and advances axially from said forming means, and opposed rollers between which such helically disposed wire is adapted to pass, said last-named rollers being adapted to press a continuous strip of wall material fed therebetween against such wire.

24. In apparatus for the continuous production of flexible tubing, forming means adapted to form a wire fed thereto into a helix, means operative to feed a wire to such forming means, means adapted to support and contain such helix exteriorly thereof as it continuously rotates and advances axially from said forming means, and means adapted to wind a continuous strip of wall material on such rotating and advancing wire helix.

25. In apparatus for the continuous production of flexible tubing, a fixed forming station including means operative continuously to form a wire into an open helix, means adapted to support and contain such helix exteriorly thereof as it continuously rotates and advances axially from said forming station, and a second station including means adapted to wind a continuous strip of wall material on such rotating and advancing wire helix.

26. In apparatus for the continuous production of flexible tubing, a fixed forming station including means operative continuously to form a wire into a helix, whereby such helix is caused to rotate and advance axially from such forming station, and a second station including means adapted to wind a continuous strip of wall material directly on such rotating and advancing wire helix.

27. In apparatus for the continuous production of flexible tubing, a wire forming station comprising a convex surfaced-inner die member and a cooperating outer shoe having a concave surface opposed thereto, a groove in such surface of said shoe opposed to said die member adapted to receive a wire passing therebetween, such groove being disposed to direct such wire into a helical path, and a continuation of such concave surface on an arc of greater diameter adapted to support such wire issuing from between said die and shoe to form a helix of greater diameter than the diameter of the arc described by such opposed faces.

28. In apparatus for the continuous production of flexible tubing, forming means adapted to form a wire fed thereto into a helix, means operative to feed such wire to said forming means, a plurality of grooved rollers arranged to support and contain such helix circumferentially exteriorly thereof as it continuously rotates and advances axially, such grooves being adapted to receive and position the turns of such helix, and said rollers being adjustably mounted radially of such helix to define a selected diameter of helix, and means adapted to apply a continuous strip of wall material to such rotating and advancing helix thus confined.

GEORGE L. MEYERS.
JOHN E. SCHRINER.
JOHN C. SHUTT.

REFERENCES CITED

The following references are of record in the file of this patent:

UNITED STATES PATENTS

| Number | Name | Date |
|---|---|---|
| 153,388 | Smith | July 21, 1874 |
| 550,991 | Meyer | Dec. 10, 1895 |
| 657,878 | Kirk | Sept. 11, 1900 |
| 725,723 | Kirk | Apr. 21, 1903 |
| 846,996 | Greenfield | Mar. 12, 1907 |
| 1,198,392 | Brinkman | Sept. 12, 1916 |
| 1,207,880 | Doerr | Dec. 12, 1916 |
| 1,367,814 | Hathaway | Feb. 8, 1921 |
| 1,478,083 | Whitmarsh | Dec. 18, 1923 |
| 1,570,886 | Fulton et al. | Jan. 26, 1926 |
| 1,955,410 | Colbie | Apr. 17, 1934 |
| 2,010,061 | Curtiss | Aug. 6, 1935 |
| 2,113,428 | Hanna | Apr. 5, 1938 |
| 2,156,899 | Pierce | May 2, 1939 |
| 2,175,459 | Gleason | Oct. 10, 1939 |
| 2,360,826 | Yellin | Nov. 28, 1944 |
| 2,388,401 | Freundlich | Nov. 6, 1945 |
| 2,396,059 | Roberts | Mar. 5, 1946 |
| 2,452,047 | Hamblin | Oct. 26, 1948 |
| 2,486,387 | Bringolf | Nov. 1, 1949 |